United States Patent
Novak et al.

(10) Patent No.: US 9,767,601 B2
(45) Date of Patent: Sep. 19, 2017

(54) RESIDUAL RATIO TRACKING FOR ESTIMATING ATTENUATION IN HETEROGENEOUS VOLUMES

(71) Applicant: Disney Enterprises, Inc., Burbank, CA (US)

(72) Inventors: Jan Novak, Zürich (CH); Wojciech Jarosz, Zürich (CH); Andrew Selle, Montrose, CA (US)

(73) Assignee: Disney Enterprises, Inc., Burbank, CA (US)

( * ) Notice: Subject to any disclaimer, the term of this patent is extended or adjusted under 35 U.S.C. 154(b) by 483 days.

(21) Appl. No.: 14/548,158

(22) Filed: Nov. 19, 2014

(65) Prior Publication Data

US 2016/0061729 A1  Mar. 3, 2016

Related U.S. Application Data

(60) Provisional application No. 62/043,347, filed on Aug. 28, 2014.

(51) Int. Cl.
 *G01N 21/59* (2006.01)
 *G06T 15/50* (2011.01)

(52) U.S. Cl.
 CPC ................... *G06T 15/506* (2013.01)

(58) Field of Classification Search
 CPC ....... G06T 15/55; G06T 15/506; G06T 15/06; G06F 17/5009
 See application file for complete search history.

(56) References Cited

U.S. PATENT DOCUMENTS

| | | | | |
|---|---|---|---|---|
| 8,223,148 B1* | 7/2012 | Carr | ........................ | G06T 15/06 345/426 |
| 8,508,733 B2* | 8/2013 | Gautron | .................. | G06T 15/55 356/337 |
| 2007/0229502 A1* | 10/2007 | Tong | ....................... | G06T 15/55 345/426 |
| 2008/0317308 A1* | 12/2008 | Wu | ....................... | G06K 9/4638 382/128 |
| 2009/0006046 A1* | 1/2009 | Zhou | ....................... | G06T 15/55 703/2 |

(Continued)

OTHER PUBLICATIONS

Leppänen, Jaakko. "Performance of Woodcock delta-tracking in lattice physics applications using the Serpent Monte Carlo reactor physics burnup calculation code." Annals of Nuclear Energy 37.5 (2010): 715-722.*

(Continued)

*Primary Examiner* — Sultana M Zalalee
(74) *Attorney, Agent, or Firm* — Farjami & Farjami LLP (57) ABSTRACT

There is provided a system including a memory storing a software application and a processor configured to execute the software application to transmit a light through a scene, the scene including a medium described by an extinction function, define a fictitious medium described by a fictitious extinction function, determine a path through the medium, the path including a plurality of points, calculate one of a plurality of weights for each of the plurality of points, the one of the plurality of weights corresponding to one minus the ratio of the extinction function to the fictitious extinction function, and estimate a transmittance of the lights through the medium as a product of the plurality of weights.

20 Claims, 11 Drawing Sheets

(56) References Cited

U.S. PATENT DOCUMENTS

2013/0346041 A1* 12/2013 Gautron ............... G06T 15/506
703/2

OTHER PUBLICATIONS

Galtier, Mathieu, et al. "Integral formulation of null-collision Monte Carlo algorithms." Journal of Quantitative Spectroscopy and Radiative Transfer 125 (2013): 57-68.*

In re Grams, 888 F. 2d 835—Court of Appeals, Federal Circuit 1989.*

"Free Path Sampling in High Resolution Inhomogeneous Participating Media"; László Szirmay-Kalos, Balázs Tóth, and Milán Magdics; *Computer Graphics forum* vol. 0 (1981), No. 0 pp. 1-12.

"Monte Carlo Sampling with Continuously Varying Cross Sections Along Flight Paths"; L. L. Carter, E. D. Cashwell, and W.M. Taylor; *Nuclear Science and Engineering*: 48, 403-411(1972).

"Mathematical Verification of a Certain Monte Carlo Sampling Technique and Applications of the Technique to Radiation Transport Problems"; W. A. Coleman; *Nuclear Science and Engineering*: 32, 76-81 (1968).

"Integral formulation of null-collision Monte Carlo algorithms"; M. Galtier, S.Blanco, C. Caliot, C. Coustet, J. Dauchet, M. El Hafi V. Eymet, R. Fournier, J. Gautrais, A. Khuong, B. Piaud , G. Terrée; *Journal of Quantitive Spectroscopy & Radiative Transfer* 125 (2013) 57-68.

"Non-analog Monte Carlo estimators fro radiation momentum deposition"; Joshua M.Hykes, Jeffery D. Densmore; *Journal of Quantitive Spectroscopy & Radiative Transfer* 110 (2009) 1097-1110.

* cited by examiner

RESIDUAL RATIO TRACKING FOR ESTIMATING ATTENUATION IN HETEROGENEOUS VOLUMES

RELATED APPLICATION(S)

The present application claims the benefit of and priority to a U.S. Provisional Patent Application Ser. No. 62/043,347, filed Aug. 28, 2014, and titled "Residual Ratio Tracking for Estimating Attenuation in Heterogeneous Volumes," which is hereby incorporated by reference in its entirety into the present application.

BACKGROUND

The world around us is filled with participating media that attenuates and scatters light as it travels from light sources, to surfaces, and finally to our eyes. Simulating this radiative transport in heterogeneous participating media, such as smoke, clouds, nuclear reactor housings, biological tissue, or other volumetric datasets, is important to many fields. For example, simulating radiative transport in heterogeneous participating media may be important in medical physics, neutron transport, scientific visualization, and film and visual effects production.

Monte Carlo path sampling approaches are practical approaches for accurately approximating this light transport in a scene. Central to Monte Carlo path sampling approaches, however, is a need to evaluate transmittance (fractional visibility) between two points in the scene. Unfortunately, in heterogeneous media, a tremendous numerical approximation is necessary, and relatively little research has been done on performing this critical operation efficiently.

As for other approaches, traditional ray marching techniques result in unpredictable, systematic bias and require many fine steps in high-resolution data. Also, unbiased free-flight sampling techniques like delta tracking can be adapted to estimate transmittance, but unfortunately they result in coarse binary estimators with high variance. As such, both of these options lead to either substantially increased computation times or artifacts in the form of bias or noise.

SUMMARY

The present disclosure is directed to residual ratio tracking for estimating attenuation in heterogeneous volumes, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not drawn to scale, and are not intended to correspond to actual relative dimensions.

Figure 1:
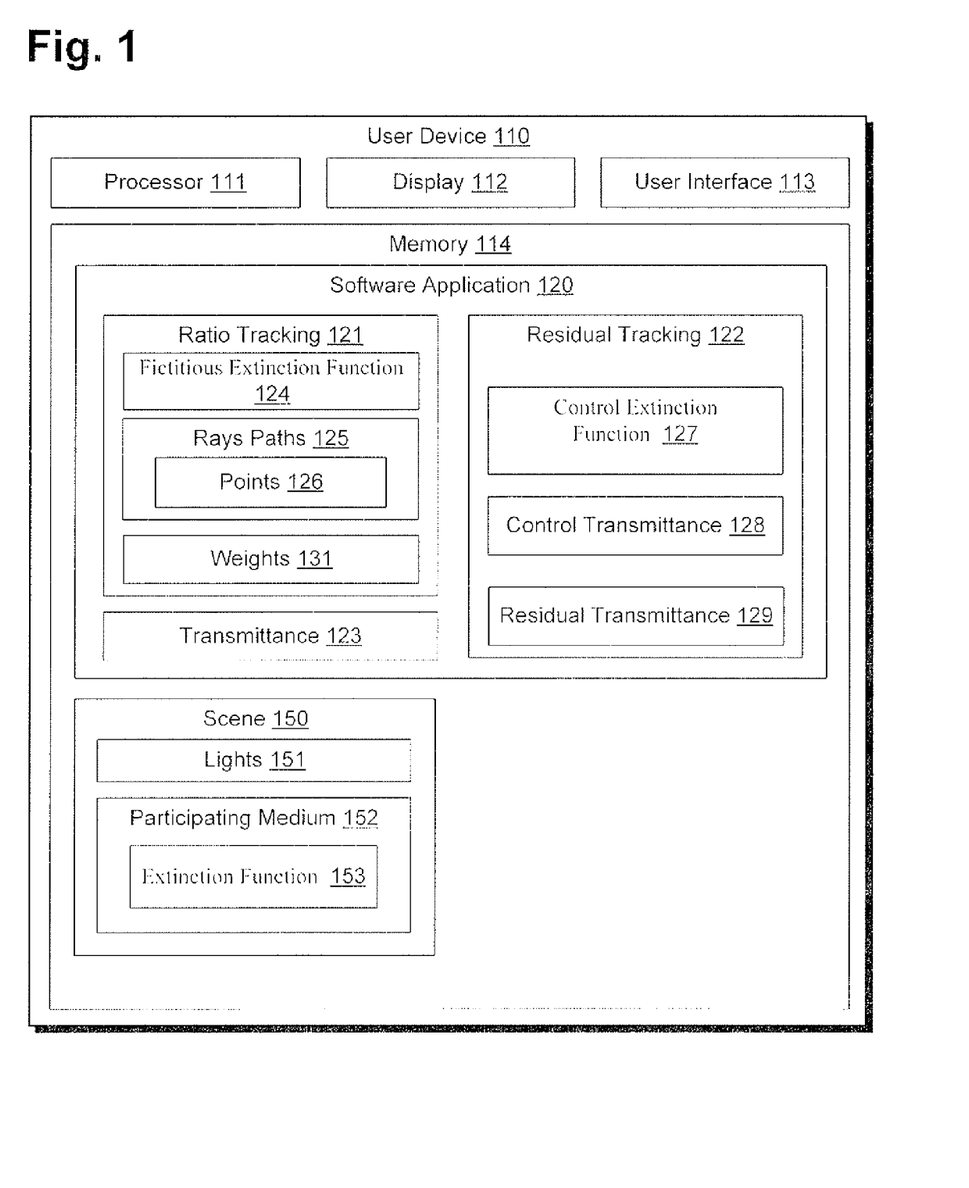
FIG. 1 presents a system used for residual ratio tracking for estimating attenuation in heterogeneous volumes, according to one implementation of the present disclosure.

FIG. 1 presents a system used for residual ratio tracking for estimating attenuation in heterogeneous volumes, according to one implementation of the present disclosure. FIG. 1 includes user device 110, which includes processor 111, display 112, user interface 113, and memory 114. Memory 114 includes software application 120 and scene 150. Software application 120 includes ratio tracking 121, residual tracking 122, and transmittance 123. Ratio tracking 121 includes fictitious extinction function 124, ray paths 125, and weights 131. Ray paths 125 include points 126. Residual tracking 122 includes control extinction function 127, control transmittance 128, and residual transmittance 129. Scene 150 includes lights 151 and participating medium 152. Participating medium 152 includes extinction function 153.

User device 110 may include a personal computer, a server, a mobile phone, a tablet, or any other device capable of executing software application 120. As shown in FIG. 1, user device 110 includes display 112 and user interface 113. User interface 113 may comprise, for example, a keyboard, a mouse, a game controller, a touch-screen input, a thermal and/or electrical sensor, or any other device capable of accepting user input for use with user device 110. Display 112 may comprise a liquid crystal display ("LCD"), a light-emitting diode ("LED"), an organic light-emitting diode ("OLED"), or another suitable display screen built into user device 110 that performs a physical transformation of signals to light. In some implementations, display 112 may also be touch sensitive and may serve as user interface 113.

Also illustrated in FIG. 1, user device 110 includes processor 111 and memory 114. Processor 111 may be configured to access memory 114 to store received input or to execute commands, processes, or programs stored in memory 114, such as software application 120. Processor 111 may correspond to a processing device, such as a microprocessor or similar hardware processing device, or a plurality of hardware devices. Memory 114 is a sufficient memory capable of storing commands, processes, and programs for execution by processor 111.

As shown in FIG. 1, user device 110 includes software application 120. User device 110 utilizes software application 120 to quickly and efficiently evaluate the transmittance of light through a participating medium, such as evaluating transmittance 123 of light through participating medium 152 of scene 150. Scene 150 may include any scene or image that is capable of being rendered by user device 110. Participating medium 152 may include any homogeneous or heterogeneous participating medium that attenuates and scatters light as it travels from light sources within scene 150, such as lights 151. As such, participating medium 152 may include, but is not limited to, smoke, clouds, or other volumes that may attenuate and scatter lights 151 within scene 150. The practicality of these improvements discussed herein are shown by incorporating the methods of the present disclosure into a production rendering system, demonstrating substantial noise reduction in a number of scenes with complex heterogeneous media.

In order to quickly and efficiently evaluate transmittance 123 through participating medium 152, software application 120 uses ratio tracking 121 and optionally residual tracking 122. Ratio tracking 121 may be utilized by software application 120 to estimate transmittance 123 of light through participating medium 152 probabilistically by walking along ray paths 125 in participating medium 152 and computing weights 131 at points 126 along ray paths 125, where weights 131 are based on the value of extinction function 153 of participating medium 152 and fictitious extinction function 124, which is explained in greater detail below. Software application 120 then estimates transmittance 123 of light through participating medium as the product of weights 131 at all of points 126 along ray paths 125. Residual tracking 122 may be utilized by software application 120 to estimate transmittance 123 of light through participating medium 152 by calculating control transmittance 128, which corresponds to a coarse approximation of transmittance 123, and residual transmittance 129, which accounts for the difference between control extinction function 128, which is used to calculate control transmittance 128, and extinction function 153.

It should be noted that ratio tracking 121 and residual tracking 122 are complementary techniques that may be combined into an efficient estimator for evaluating transmittance 123 of light through participating medium 152. For example, in one implementation, software application 120 first utilizes residual tracking 122 to compute control transmittance 128 for participating medium 152. In such an implementation, software application 120 then calculates residual transmittance 129 for participating medium 152 using a modified ratio tracking 121. Next, software application 120 calculates the product of control transmittance 128 and residual transmittance 129 to determine transmittance 123 of light through participating medium 152, where residual transmittance 129 is obtained using the modified ratio tracking 121 and control transmittance 128 is computed w.r.t. control extinction function 127.

As illustrated in FIG. 1, ratio tracking 121 includes fictitious extinction function 124, ray paths 125, and weights 131. Ratio tracking 121 estimates transmittance 123 of light through participating medium 152 by first defining fictitious extinction function 124, which enables sampling free-flight distances between points 126 in participating medium 153 efficiently, e.g. analytically. For example, participating medium 152 may include extinction function 153, which corresponds to the loss of light due to out-scattering and absorption of light particles per unit distance traveled through participating medium 152. In such an example, extinction function 153 may vary arbitrarily throughout participating medium, which may not allow efficient sampling of free-flight distances between points 126. As such, ratio tracking 121 first defines fictitious extinction function 124 that allows efficient sampling of free-flight distances between points 126. An example of such fictitious extinction function is a constant function, see FIGS. 2B and 4B for an illustration.

After defining fictitious extinction function 124, ratio tracking 121 evaluates transmittance 123 of light along ray paths 125 through participating medium 152, where ray paths 125 include points 126. Points 126 include locations along ray paths 125 where weights 131 are calculated based on the value of extinction function 153 and fictitious extinction function 124. For example, weights 131 at each of points 126 may be calculated by subtracting the local ratio of extinction function 153 to fictitious extinction function 124 from one. Transmittance 123 along ray paths 125 is then estimated as the product of all of weights 131 at points 126 along the entire distance of ray paths 125.

It should be noted that ray paths 125 may include any number of points 126 used for determining transmittance 123 of light through participating medium 152. For example, in one implementation, the number of points 126 along ray paths 125 may depend on the value of fictitious extinction function 124. If the mean value of fictitious extinction function 124 is high, the number of points 126 will be higher and the computation more expensive. The transmittance 123 will in such case be estimated more accurately. Fictitious extinction functions with low mean values lead to fewer points 126 and thus faster, but more approximate estimation of transmittance 123. Fictitious extinction functions that tightly bound extinction function 153 from top yield good balance between number of points 123 and accuracy of the estimation.

Also illustrated in FIG. 1, residual tracking 122 includes control extinction function 127, control transmittance 128, and residual transmittance 129. As will be explained in greater detail below in FIGS. 4C-4E, residual tracking 122 estimates transmittance 123 of light through participating medium 152 by first determining control extinction function 127. Control extinction function 127 may include a simplified version of extinction function 153 for participating medium 152, where the extinction function 153 corresponds to the total loss of light due to absorption and out-scattering per unit distance traveled through participating medium 152.

After determining control extinction function 127, software application 120 then utilizes residual tracking 122 to compute control transmittance 128 using control extinction function 127, where control transmittance 128 includes a course approximation of transmittance 123 through participating medium 152. Next, software application 120 utilizes modified ratio tracking 121 to compute residual transmittance 129 using residual extinction function, where the residual extinction function is defined as the difference between extinction function 153 and control extinction function 127. Residual transmittance 129 corresponds to a correction that accounts for the difference between control transmittance 128 and transmittance 123 of light through participating medium 152. Finally, software application 120 utilizes residual tracking 122 to compute transmittance 123 of light through participating medium 152 as the product of control transmittance 128 and residual transmittance 129.

Figure 2A:
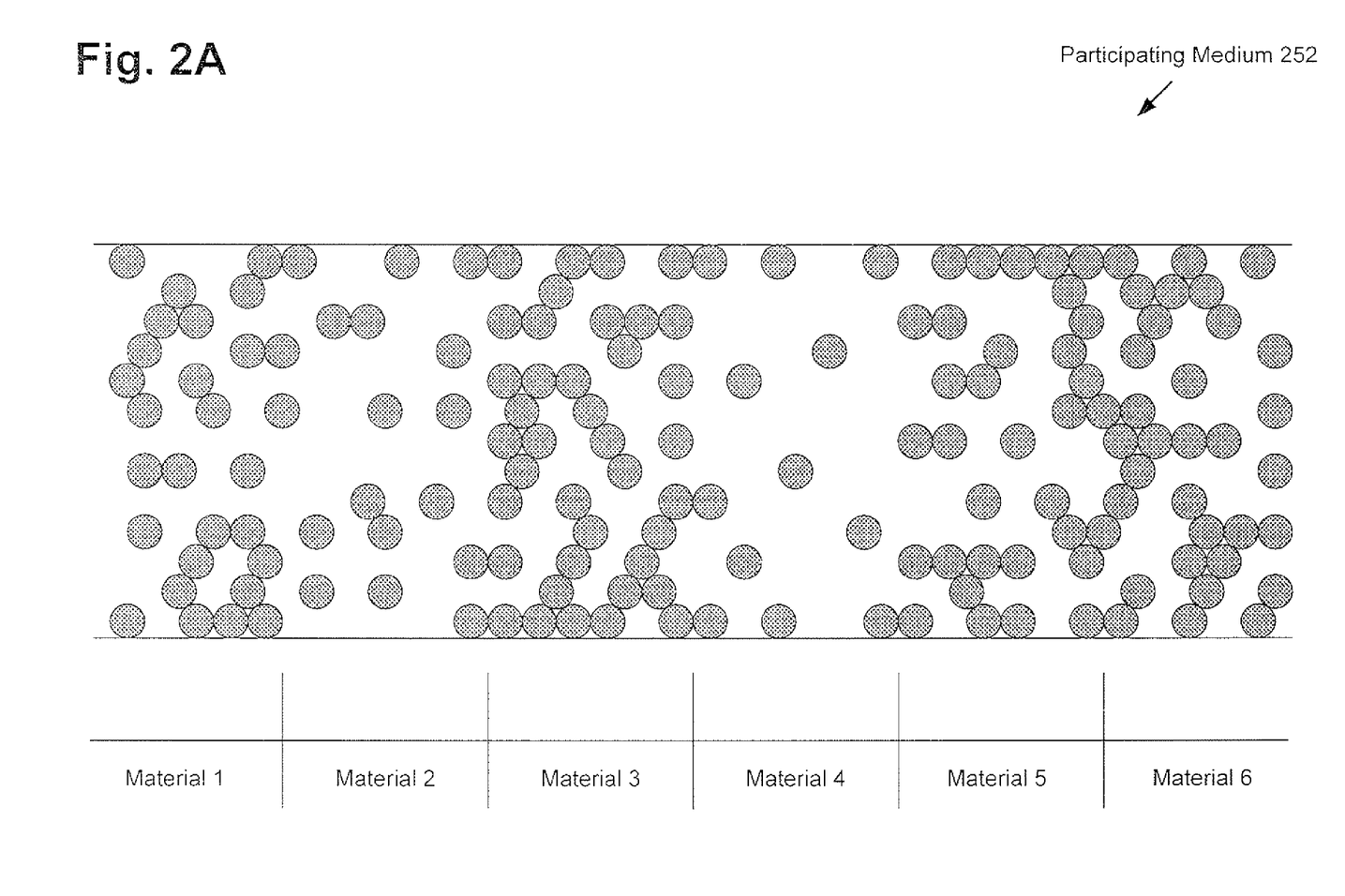
FIG. 2A presents an example of a heterogeneous medium, according to one implementation of the present disclosure.

FIG. 2A presents an example of a heterogeneous participating medium 252, where the local density of particles can be used to determine extinction function 153. FIG. 2A further illustrates an example of participating medium 252 consisting six different materials.

As illustrated in FIG. 2A, participating medium 252 is a heterogeneous material that includes six different materials. As such, each of the six different materials from FIG. 2A includes a different density of particles, which are illustrated as checkered circles. For example, material 3 is the densest material of participating medium 252, followed by material 6, material 5, material 1, material 2, and then material 4, which includes the least dense material. Since each of material 1-6 includes a different density of particles, a light traveling through participating medium 252 will be absorbed and scattered differently by each of materials 1-6.

Figure 2B:
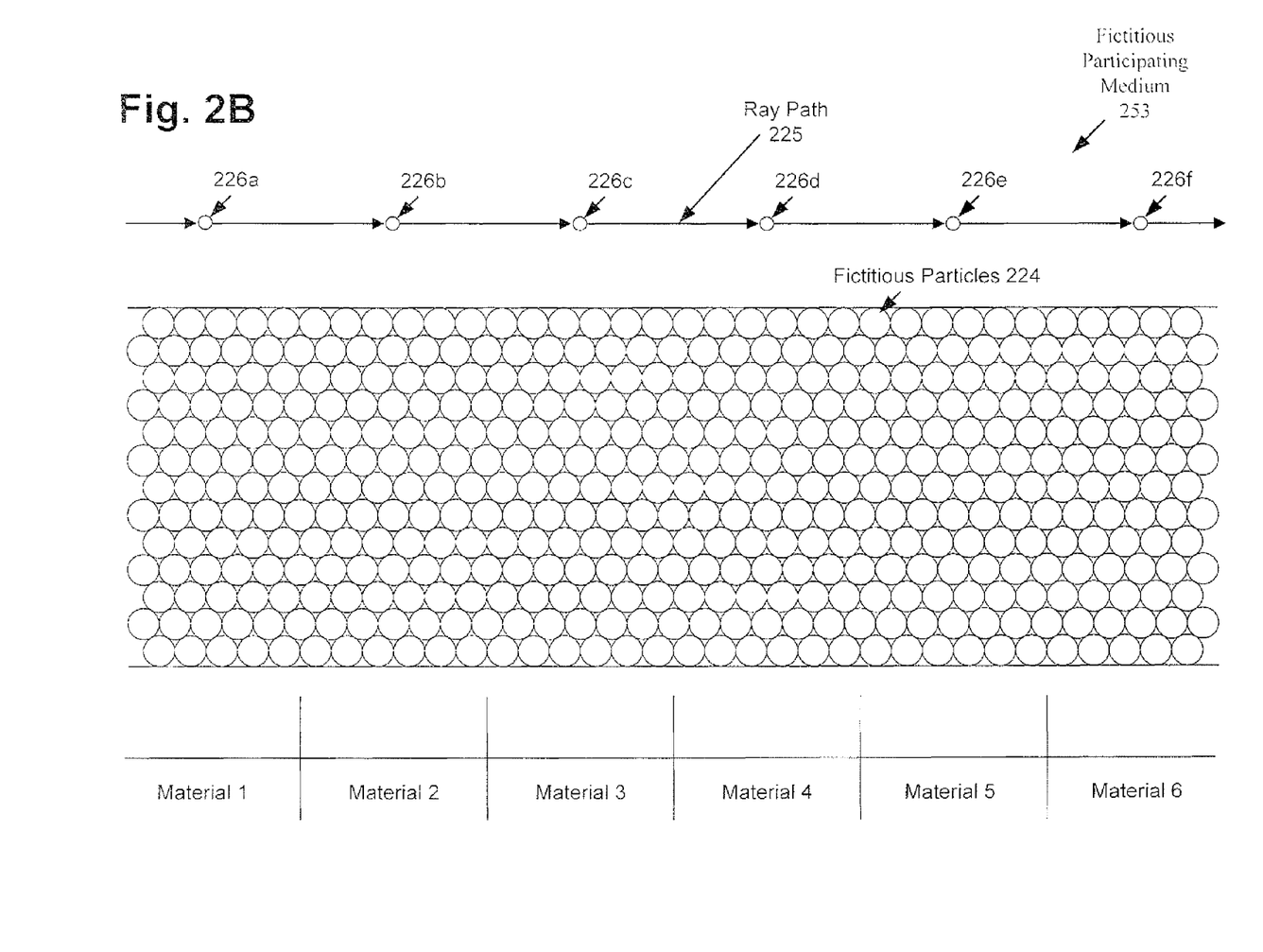
FIG. 2B presents an example of using ratio tracking to calculate the transmittance of light through a heterogeneous participating medium, according to one implementation of the present disclosure.

FIG. 2B presents an example of using ratio tracking to calculate the transmittance of light through a heterogeneous participating medium, according to one implementation of the present disclosure. FIG. 2B includes fictitious participating medium 252 that corresponds to fictitious extinction function 124. FIG. 2B further includes ray path 225, which includes point 226a, point 226b, point 226c, point 226d, point 226e, and point 226f, collectively referred to as points 226. With respect to FIG. 2B, it should be noted that ray path 225, and points 226 correspond respectively to one of ray paths 125, and points 126 from FIG. 1.

In the implementation of FIG. 2B, a software application, such as software application 120 from FIG. 1, may be using ratio tracking to estimate the transmittance of light through participating medium 252 from FIG. 2A. First, the software application uses ratio tracking to define fictitious extinction function 124 that is illustrated as fictitious participating medium 253 consisting of particles that are illustrated as circles in FIG. 2B. After defining fictitious participating medium 253, the software application then utilizes ratio tracking to shoot rays through fictitious participating medium 253, such as ray path 225. As illustrated in FIG. 2B, ray path 225 includes points 226. As discussed above, points 226 include locations along ray path 225 where a weight is calculated based on the value of extinction function 153 defined with respect to participating medium 252 and fictitious extinction function 124 defined with respect to fictitious participating medium 253. For example, the weight at each of points 226 may be calculated by subtracting the local ratio of extinction function 153 to the fictitious extinction function 124 from one, which is described in detail above. Finally, the transmittance along ray path 225 is estimated as the product of all of the weights at points 226 along the entire distance of ray path 225.

For example, and as illustrated in the implementation of FIG. 2B, ray path 225 includes six points 226, where each one of points 226 is located within one of materials 1-6 of participating medium 252. In such an example, ratio tracking would calculate a weight at each of points 226 by subtracting the ratio of extinction function 153 to fictitious extinction function 124 from one, at each of the six points 226. As such, ratio tracking would calculate a weight at point 226a in material 1, a weight at point 226b in material 2, a weight at point 226c in material 3, a weight at point 226d in material 4, a weight at point 226e in material 5, and a weight at point 226f in material 6. Ratio tracking 221 would then estimate the transmittance along ray path 225 as the product of all of the weights calculated above.

For example, the equation used to calculate the transmittance through participating medium 252 using ratio tracking may include:

$$\text{Transmittance} = \prod_{i=1}^{K} \left(1 - \frac{u(x_i)}{\bar{u}(x_i)}\right)$$

where K is the number of points 226, u is the value of extinction function 153 at point $x_i$, and $\bar{u}$ is the value of fictitious extinction function at point $x_i$.

It should be noted that the implementation of FIG. 2B only illustrates ray path 225 as including six points 226 with each of points 226 being in one of materials 1-6. However, the present disclosure is not limited to the implementation of FIG. 2B. In other implementations, ray path 225 may include any number of points through participating medium 252. In such implementations, any number of the points may be in materials 1-6. For example, ray path 225 may include three points, where a first point is in material 1, a second point is in material 2, and a third point is in material 3.

Figure 3:
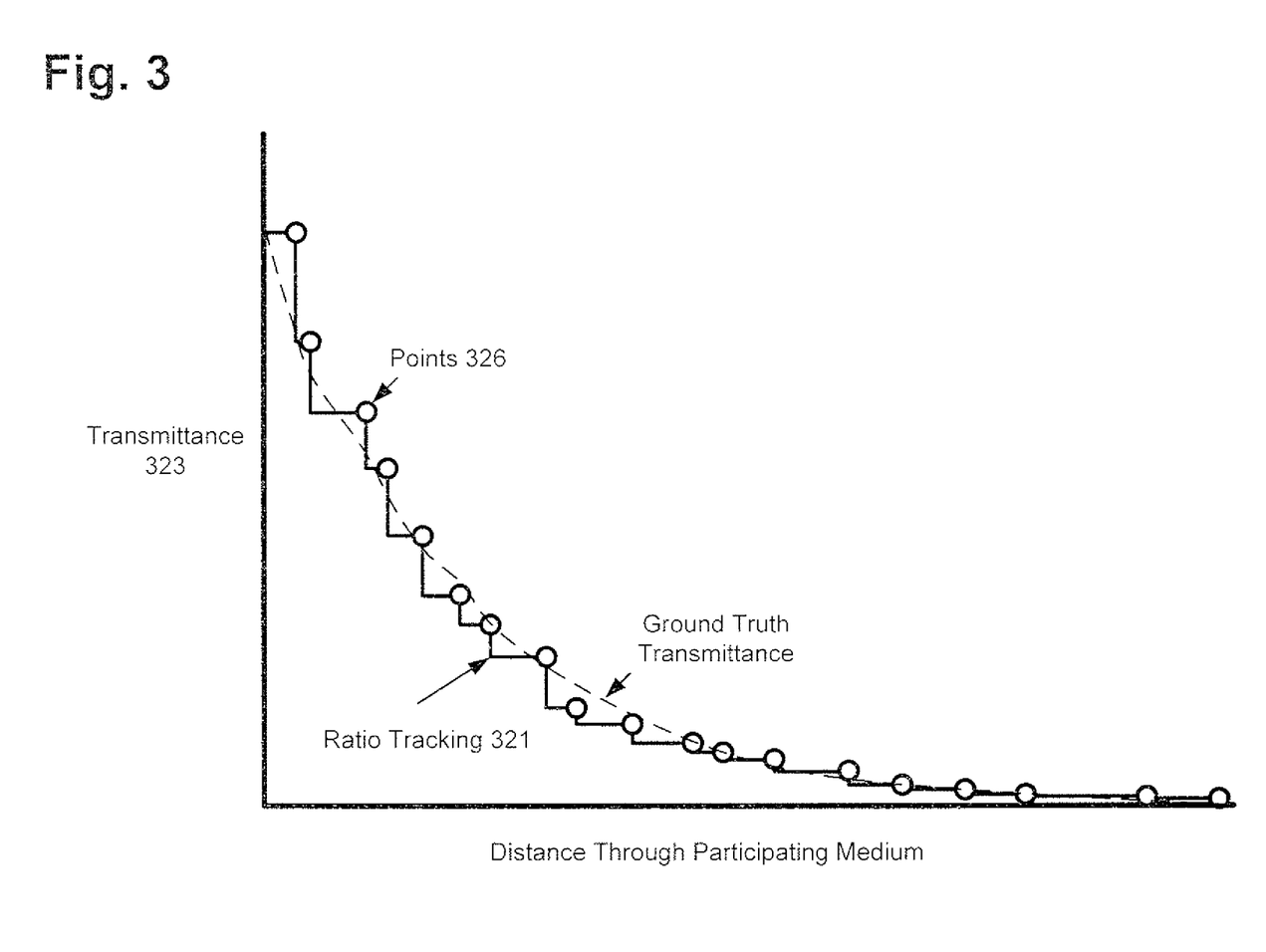
FIG. 3 presents a graph illustrating the difference between estimating the transmittance through a participating medium using ratio tracking and the ground truth transmittance through the same participating medium, according to one implementation of the present disclosure.

FIG. 3 presents a graph illustrating the difference between estimating the transmittance through a participating medium using ratio tracking and the ground truth transmittance through the same participating medium, according to one implementation of the present disclosure. FIG. 3 includes ratio tracking 321, points 326, and transmittance 332, which correspond respectively to ratio tracking 121, points 126, and transmittance 132 from FIG. 1.

As illustrated in the implementation of FIG. 3, a software application may have calculated the transmittance through a participating medium using ratio tracking 321, such as software application 120 calculating transmittance 123 through participating medium 152 using ratio tracking 121 from FIG. 1. As such, at each of points 326, a weight is calculated based on the value of extinction function 153 and fictitious extinction function 124. As illustrated in FIG. 3, ratio tracking 321 estimates the transmittance through the participating medium similarly to the ground truth transmittance, which includes the actual transmittance through the participating medium.

It should be noted that the implementation of FIG. 3 only illustrates one instance of using ratio tracking 321 to estimate the transmittance through the participating medium, however, the present disclosure is not limited to the implementation of FIG. 3. In other implementations, the software application may use ratio tracking 321 to estimate the transmittance through the participating medium more than one time. In such implementations, the software application may average the results of each of the estimations to better estimate the ground truth transmittance function.

Figure 4A:
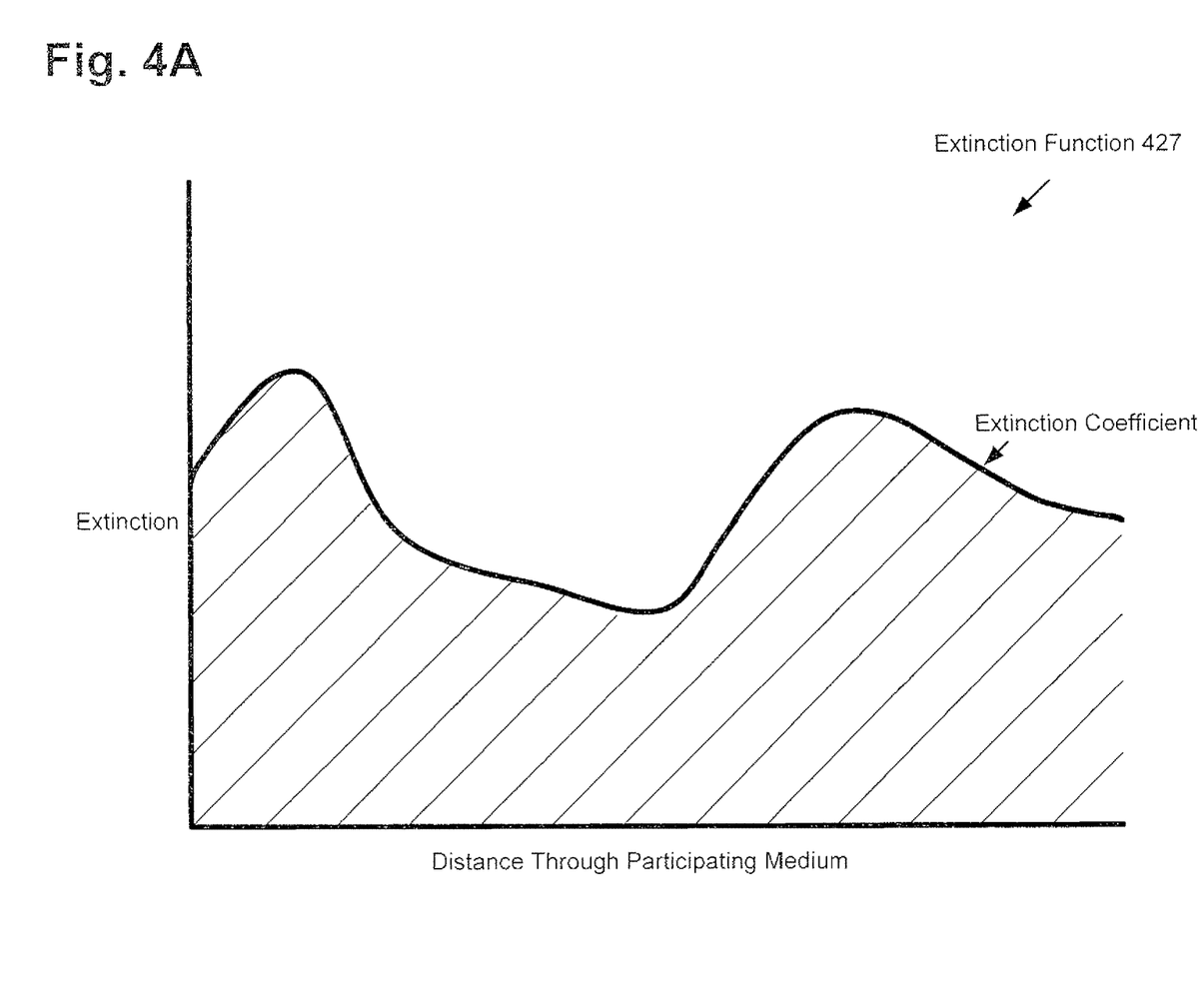
FIG. 4A presents an example of an extinction function.

FIG. 4A presents an example of extinction function 153 used for determining the fictitious extinction function 124 used with residual tracking, according to one implementation of the present disclosure. FIG. 4A includes extinction function 427, which corresponds to extinction function 153 from FIG. 1.

As illustrated in the implementation of FIG. 4A, extinction function 427 is represented as a graph that illustrates the extinction of light due to absorption and out-scattering per unit distance traveled through a participating medium (such as participating medium 152 from FIG. 1), which is represented by the extinction coefficient line. Extinction function 427 also illustrates the total extinction of light through the participating medium, which includes the area under the extinction coefficient line and is represented by the diagonal lines.

Figure 4B:
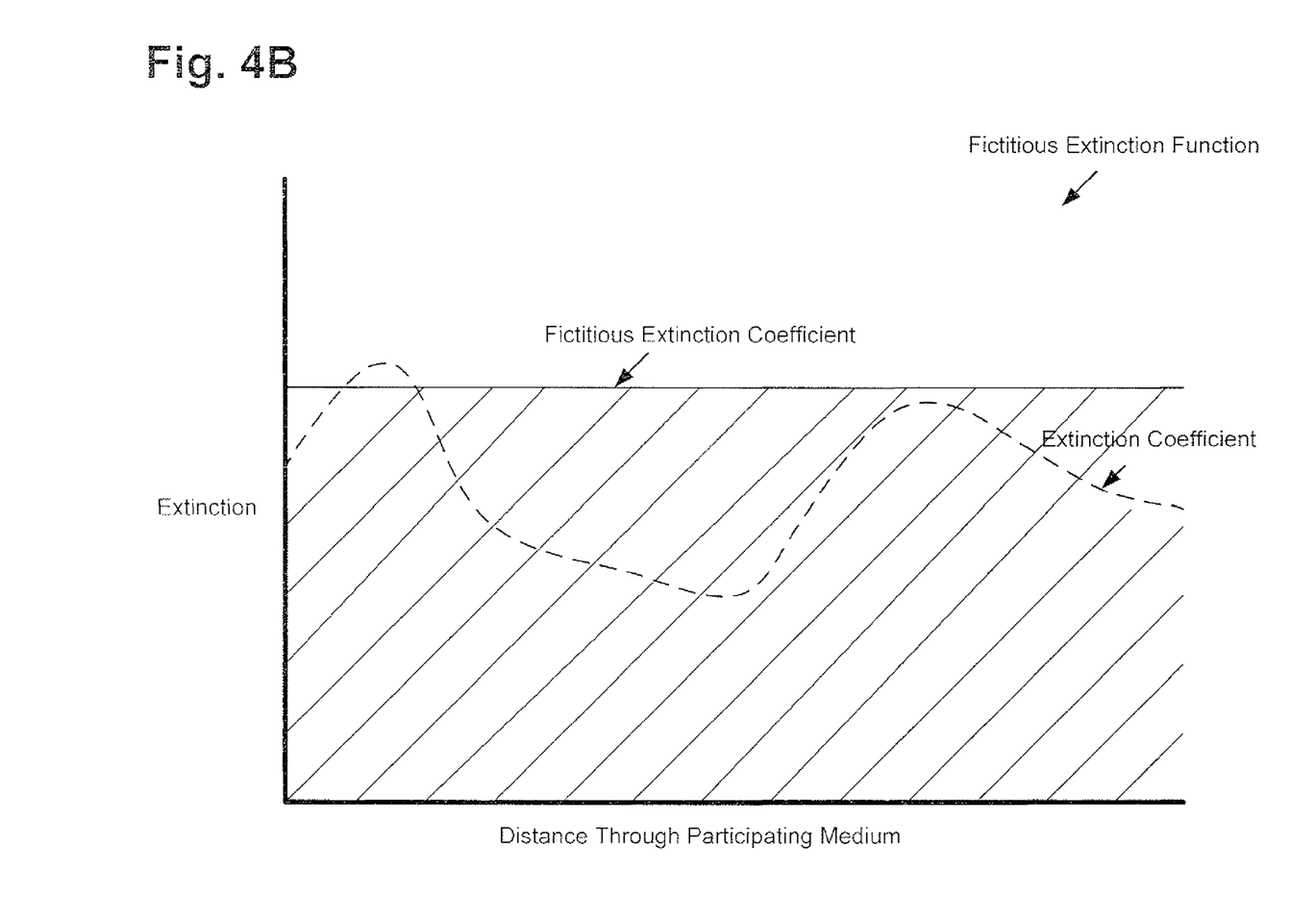
FIG. 4B presents an example of a fictitious extinction function for use with ratio tracking, according to one implementation of the present disclosure.

When selecting a fictitious extinction function to be used in ratio tracking, such as selecting fictitious extinction function 124 to be used in ratio tracking 121 from FIG. 1, a software application may choose an arbitrary value of the extinction coefficient as illustrated in FIG. 4B. The software application may, for instance, choose the maximum value of extinction coefficient, or any other function that bounds the extinction function as the fictitious extinction function.

It should be noted that the implementation FIG. 4B illustrates selecting one of the possible functions as the fictitious extinction function, however, the present disclosure is not limited to the implementation of FIG. 4B or the values and functions described above and the software application may choose any arbitrary function as the fictitious extinction function.

When selecting a control extinction function to be used in residual tracking, such as selecting control extinction function 127 to be used in residual tracking 122 from FIG. 1, a software application may choose, for instance, the minimum, maximum, or the average value of the extinction function along the ray path. For example, and as illustrated in FIG. 4C, the software application may have chosen the average value of extinction coefficient along the ray path as the control extinction coefficient for residual tracking.

Figure 4C:
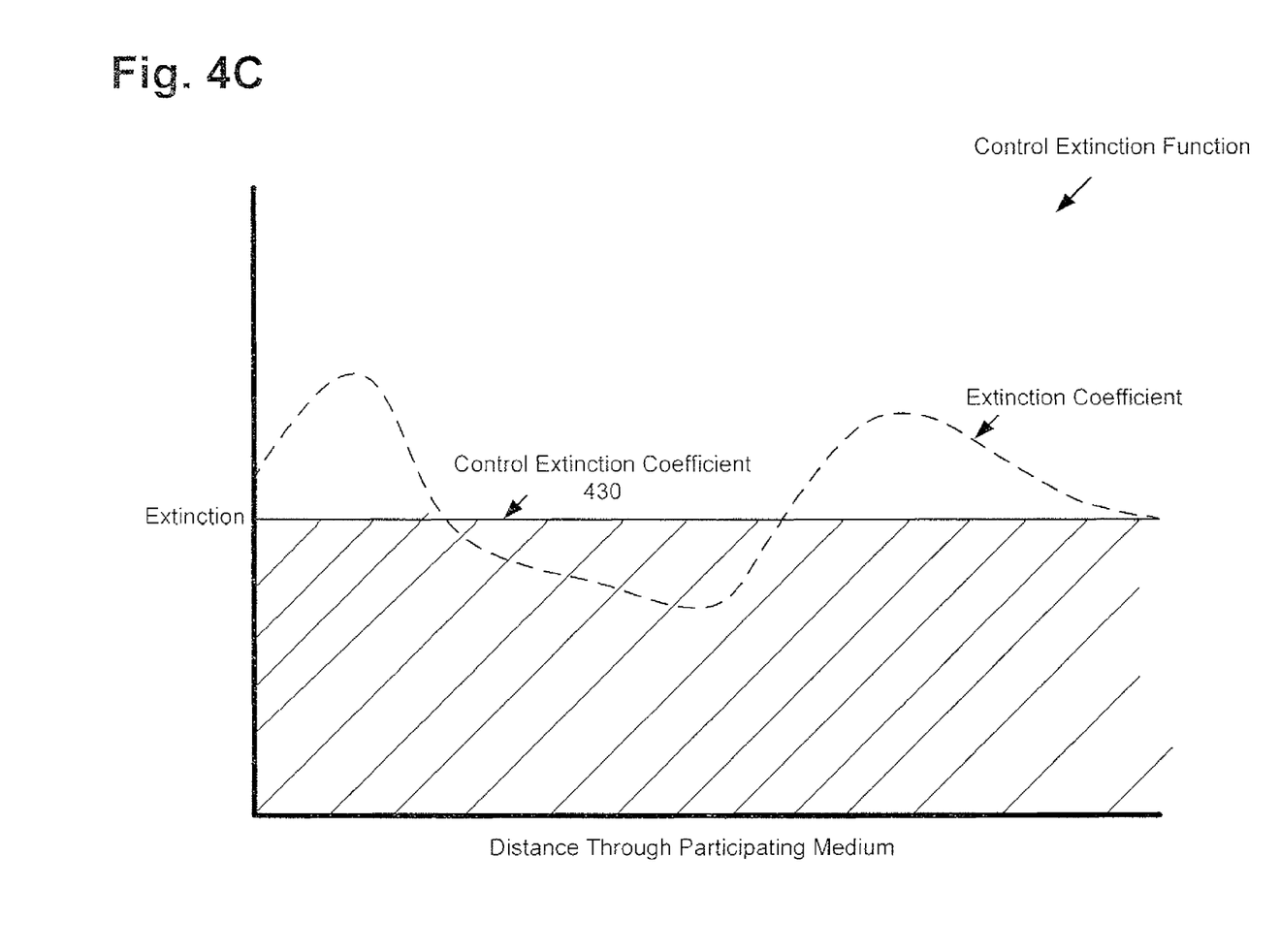
FIG. 4C presents an example of a control extinction function that is used to calculate the control transmittance for residual tracking, according to one implementation of the present disclosure.

It should be noted that the implementation of FIG. 4C only illustrates selecting one of the possible control extinction functions, however, the present disclosure is not limited to the implementation of FIG. 4C. In other implementations, a software application may select any point on the extinction coefficient as the control extinction coefficient for residual tracking. Furthermore, still in other implementations, the software application may choose a point that is not part of the extinction coefficient as the control extinction coefficient for residual tracking.

FIG. 4C presents an example of using the control extinction coefficient to calculate the control transmittance for residual tracking, according to one implementation of the present disclosure. FIG. 4C includes a control extinction function, which includes control extinction coefficient 430. The control extinction function further includes the control extinction, which includes the area under control extinction coefficient 430 and is represented by diagonal lines. With regard to FIG. 4C, it should be noted that control extinction coefficient 430 from FIG. 4B represents control extinction coefficient 127 from FIG. 1.

In order to estimate the transmittance through a participating medium, the software application first uses residual tracking to calculate the control transmittance using control extinction function defined by the control extinction coefficient 430. For example, software application 120 may utilize residual tracking 122 to calculate control transmittance 128 using control extinction function 127 from FIG. 1. To calculate the control transmittance, the software application takes the exponential of the negative integral of the control extinction function. For example, the equation for calculating the control transmittance may include:

$$\text{Control Transmittance} = \exp(-\int_0^d u_c(x)dx)$$

where d is the distance through the participating medium, and $u_c$ is control extinction function defined by the control extinction coefficient 430.

Figure 4D:
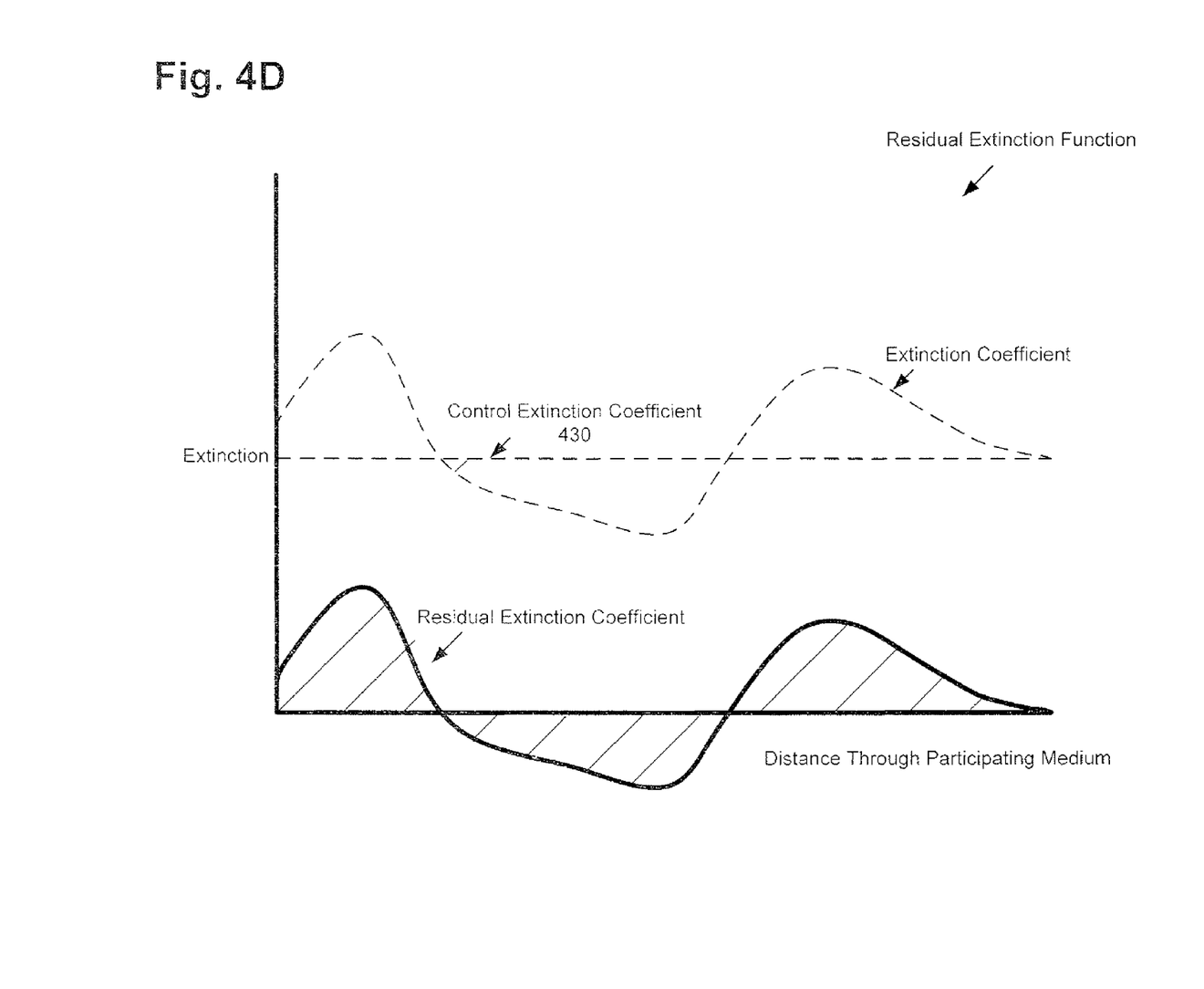
FIG. 4D presents an example of a residual extinction function that is used to calculate the residual transmittance for residual tracking, according to one implementation of the present disclosure.
Figure 4E:
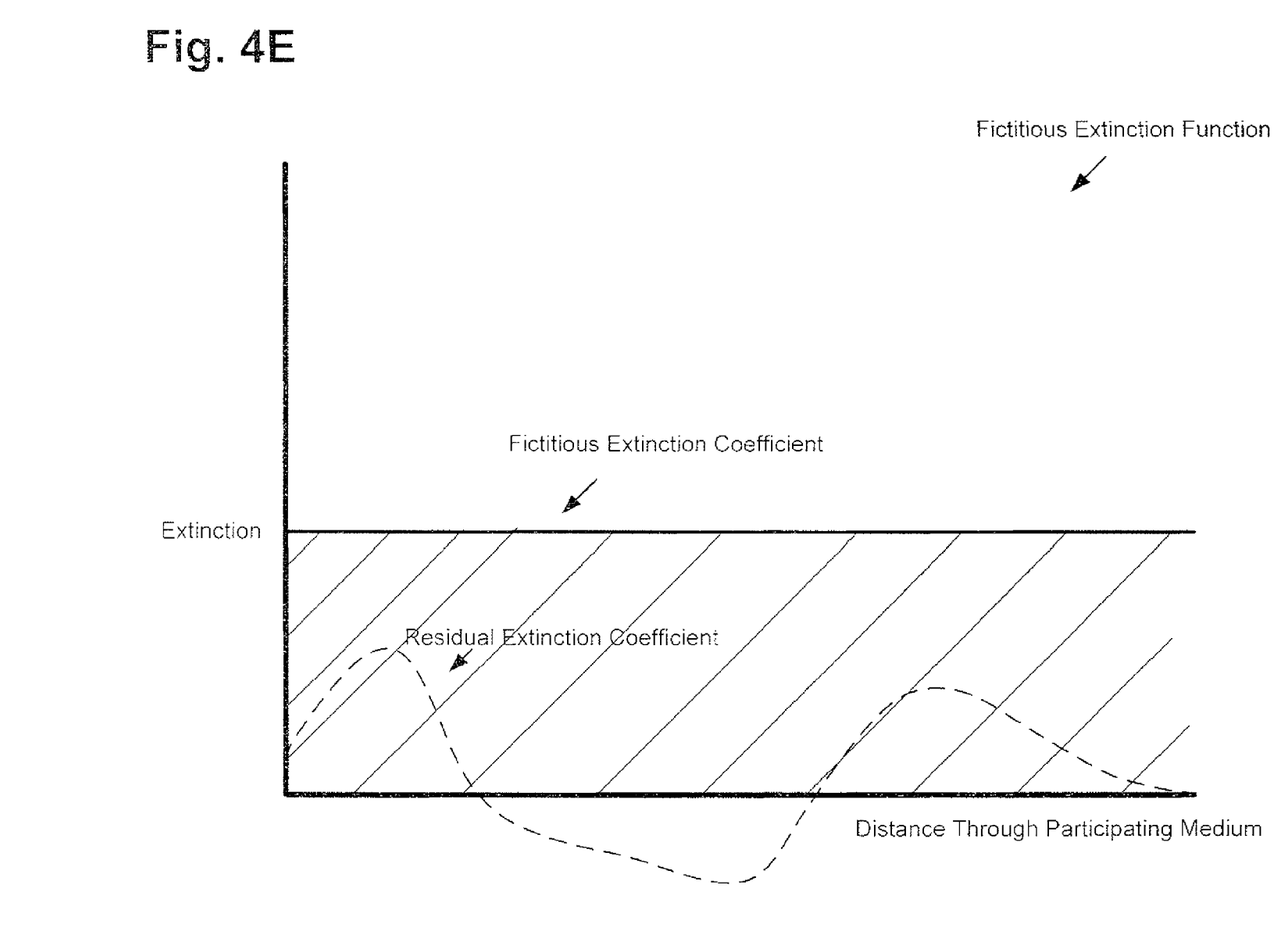
FIG. 4E presents an example of a fictitious extinction function for use with residual tracking, according to one implementation of the present disclosure.

FIG. 4D presents an example of using the control extinction function to calculate the residual transmittance for residual tracking, according to one implementation of the present disclosure. FIG. 4C includes a residual extinction function, which is defined by the residual extinction coefficient. The residual extinction coefficient is defined as the difference between the extinction coefficient and the control extinction coefficient. FIG. 4C further includes the residual extinction, which includes the areas between residual extinction coefficient and zero that are represented by the diagonal lines.

After calculating the control transmittance using control extinction coefficient 430 in FIG. 4B, the software application next needs to calculate the residual transmittance, such as software application 120 calculating residual transmittance 129 from FIG. 1. As discussed above, the residual transmittance accounts for the difference between the control transmittance and the actual transmittance. For example, and as illustrated in FIG. 4C, the control transmittance is going to be different than the actual transmittance since the control extinction illustrated in FIG. 4C differs from the actual extinction illustrated in FIG. 4A by the residual extinction illustrated in FIG. 4D.

In order to calculate the residual transmittance, the software application needs to evaluate the following equation:

$$\text{Residual Transmittance} = \exp(-\int_0^d u(x) - u_c(x)dx)$$

where u is the extinction coefficient, and $u_c$ is control extinction coefficient 430.

It should be noted that there are many different methods that may be used for calculating the residual transmittance. For example, in one implementation, ratio tracking may be modified to only calculate the residual transmittance through the participating medium rather than the actual transmittance through the participating medium. In such an implementation, calculating the weight at points is modified using control extinction coefficient 430. The actual transmittance through the participating medium is then calculated by multiplying the control transmittance that was determined using ratio tracking and the residual transmittance that was determined using the modified ratio tracking.

For example, the equation used to calculate the residual transmittance using ratio tracking may include:

$$\text{Residual Transmittance} = \prod_{i=1}^K \left(1 - \frac{u(x_i) - u_c(x_i)}{\bar{u}(x_i)}\right)$$

where u is the value of the extinction function, $u_c$ is the value of the control extinction function, and $\bar{u}$ is the value of the fictitious extinction function. The fictitious extinction function for the modified ratio tracking should be determined from the residual extinction function (and not from the extinction function). The software application may, for instance, choose the maximum value of the residual extinction coefficient, or any other function that bounds the residual extinction function as the fictitious extinction function.

It should further be noted that besides ratio tracking, methods such as delta tracking may be used to calculate the residual transmittance for residual tracking. However, delta tracking may not be used when the residual extinction function is negative, such as in FIG. 4C.

Figure 5:
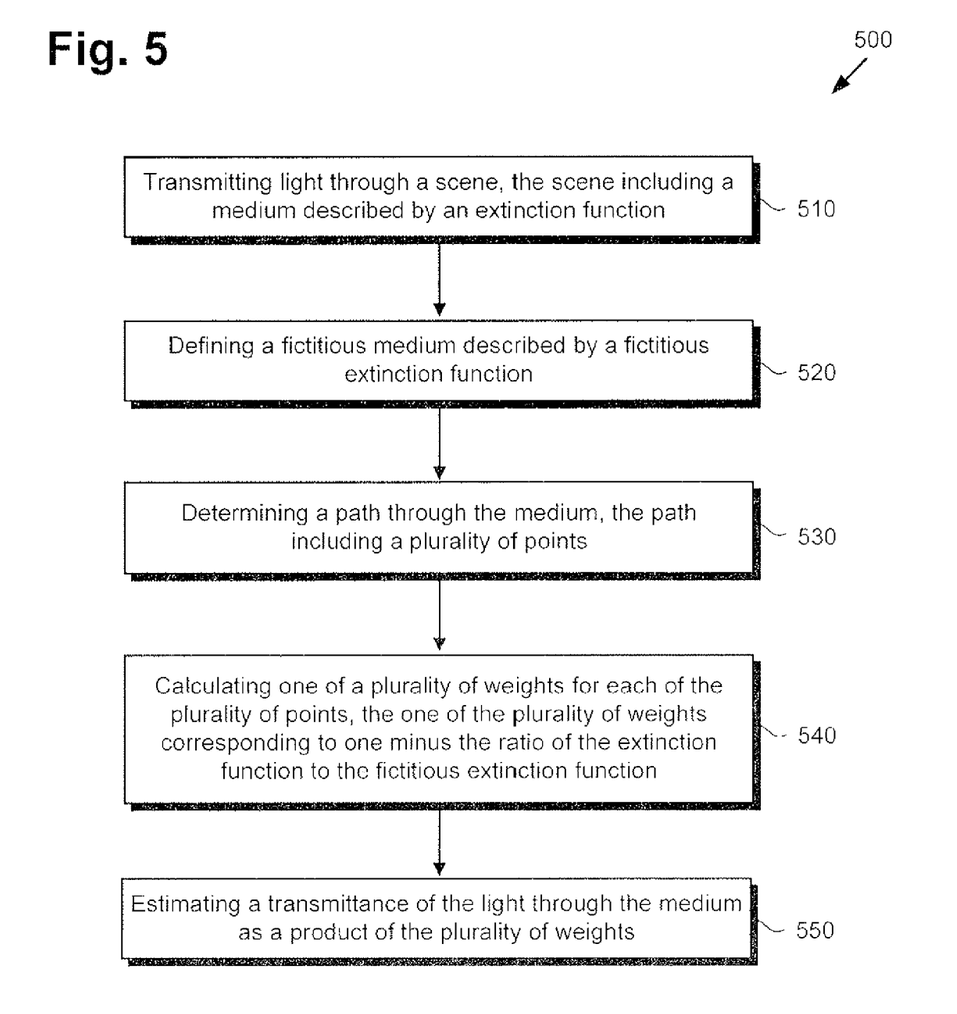
FIG. 5 shows a flowchart illustrating a method for using ratio tracking to estimate attenuation in heterogeneous volumes, according to one implementation of the present disclosure.

FIG. 5 shows a flowchart illustrating a method for using ratio tracking to estimate attenuation in heterogeneous volumes, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIG. 1, the disclosed inventive concepts are not intended to be limited by specific features shown and described with respect to FIG. 1. Furthermore, with respect to the method illustrated in FIG. 5, it is noted that certain details and features have been left out of flowchart 500 in order not to obscure the discussion of inventive features in the present application.

Referring now to flowchart 500 of FIG. 5, flowchart 500 (at 510) includes transmitting light through a scene, the scene including a medium described by an extinction function. For example, processor 111 of user device 110 may execute software application 120 to transmit lights 151 through scene 150 using ray paths 125, scene 150 including participating medium 152 described by extinction function 153. As discussed above, the extinction function 153 corresponds to the local loss of light per unit distance traveled through participating medium 152.

Flowchart 500 (at 520) continues with defining a fictitious medium described by a fictitious extinction function. For example, processor 111 of user device 110 may execute software application 120 to define a fictitious medium described by a fictitious extinction function. As discussed above, the fictitious medium may be generated by adding additional particles to participating medium 152. Furthermore, the fictitious extinction function corresponds to the local loss of light per unit distance traveled through the fictitious medium.

Flowchart 500 (at 530) continues with determining a path through the medium, the path including a plurality of points. For example, processor 111 of user device 110 may execute software application 120 to determine one of ray paths 125 through participating medium 152, the one of ray paths 125 including points 126. As illustrated in FIG. 2B, ray path 225 within participating medium 252 may include six different points 226.

Flowchart 500 (at 540) continues with calculating one of a plurality of weights for each of the plurality of points, the one of the plurality of weights corresponding to one minus the ratio of the extinction function to the fictitious extinction function. For example, processor 111 of user device 110 may execute software application 120 to calculate one of weights 131 for each of points 126, the one of weights 131 corresponding to one minus the ratio of the extinction function to the fictitious extinction function.

Flowchart 500 (at 550) continues with estimating a transmittance of the light through the medium as a product of the plurality of weights. For example, processor 111 of user device 110 may execute software application 120 to estimate transmittance 123 of light 151 through participating medium 152 as a product of weights 131.

Figure 6:
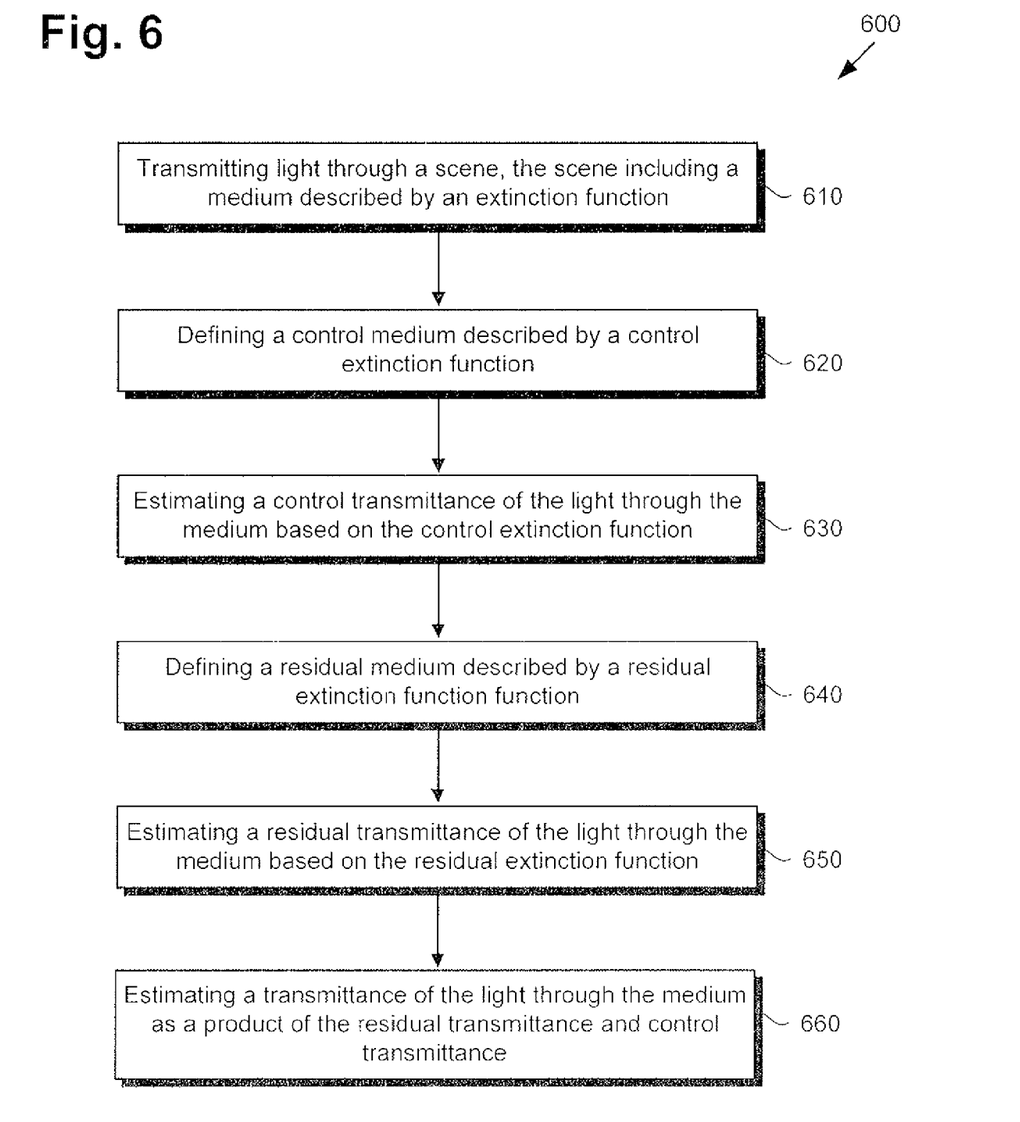
FIG. 6 shows a flowchart illustrating a method for using residual tracking to estimate attenuation in heterogeneous volumes, according to one implementation of the present disclosure.

FIG. 6 shows a flowchart illustrating a method for using residual tracking to estimate attenuation in heterogeneous volumes, according to one implementation of the present disclosure. The approach and technique indicated by flowchart 600 are sufficient to describe at least one implementation of the present disclosure, however, other implementations of the disclosure may utilize approaches and techniques different from those shown in flowchart 600. Furthermore, while flowchart 600 is described with respect to FIG. 1, the disclosed inventive concepts are not intended to be limited by specific features shown and described with respect to FIG. 1. Furthermore, with respect to the method illustrated in FIG. 6, it is noted that certain details and features have been left out of flowchart 600 in order not to obscure the discussion of inventive features in the present application.

Referring now to flowchart 600 of FIG. 6, flowchart 600 (at 610) includes transmitting light through a scene, the scene including a medium described by an extinction function. For example, processor 111 of user device 110 may execute software application 120 to transmit lights 151 through scene 150 using ray paths 125, scene 150 including participating medium 152 described by extinction function 153. As discussed above, extinction function 153 corresponds to the local loss of light per unit distance traveled through participating medium 152. As such, the extinction function may be derived from particle density of participating medium 152.

Flowchart 600 (at 620) continues with determining control extinction function 127. For example, processor 111 of user device 110 may execute software application 120 to define control extinction function 127. As illustrated in FIG. 4C, the control extinction function may include the area represented by dashed lines and labeled as the control extinction. This control extinction is described by the control extinction function.

Flowchart 600 (at 630) continues with estimating a control transmittance of the light through the participating medium based on the control extinction function. For example, processor 111 of user device 110 may execute software application 120 to estimate control transmittance 128 of light through participating medium 152 based on control extinction function 127. The control transmittance 128 is calculated by computing the exponential of the negative integral of control extinction function 130 by along the ray path.

Flowchart 600 (at 640) continues with defining a residual medium described by a residual extinction function. For example, processor 111 of user device 110 may execute software application 120 to define a residual medium described by a residual extinction function. As illustrated in FIG. 4C, the residual medium may include the area represented by the dashed lines and labeled as the residual extinction. This residual extinction is described by the residual extinction function, which represents the difference between the extinction function and the control extinction function.

Flowchart 600 (at 650) continues with estimating a residual transmittance of the light through the participating medium based on the residual extinction function. For example, processor 111 of user device 110 may execute software application 120 to estimate residual transmittance 129 of light through participating medium 152 based on the residual extinction function. As discussed above, residual transmittance 129 may be estimated using a modified version of ratio tracking 121.

Flowchart 600 (at 660) continues with estimating a transmittance of the light through the medium as the product of the residual transmittance and the control transmittance. For example, processor 111 of user device 110 may execute software application 120 to estimate transmittance 123 of light through participating medium 152 as the product of residual transmittance 129 and control transmittance 128.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A device comprising:
   a display;
   a memory storing a software application; and
   a processor configured to execute the software application to:
   transmit light through a scene, the scene including a medium described by an extinction function;
   define a fictitious medium described by a fictitious extinction function;
   determine a path through the medium, the path including a plurality of points;
   calculate one of a plurality of weights for each of the plurality of points, the one of the plurality of weights corresponding to one minus the ratio of the extinction function to the fictitious extinction function;
   estimate a transmittance of the light through the medium as a product of the plurality of weights; and
   render the scene, on the display, using the estimated transmittance of the light through the medium.

2. The device of claim 1, wherein the extinction function corresponds to a local loss of the light per unit distance traveled through the medium.

3. The device of claim 1, wherein the fictitious extinction function corresponds to a local loss of the light per unit distance traveled through the fictitious medium.

4. The device of claim 1, wherein the fictitious extinction function is defined such that free-flight distances in the fictitious medium can be sampled analytically.

5. The device of claim 1, wherein the path connects two vertices of interest between which the transmittance is to be estimated through the medium.

6. The device of claim 1, wherein the path is determined using the fictitious medium, and wherein a distance between any two consecutive points from the plurality of points is computed using the fictitious extinction function.

7. The device of claim 1, wherein the medium includes a heterogeneous medium and the fictitious medium includes a homogeneous medium.

8. A device comprising:
   a display;
   a memory storing a software application; and
   a processor configured to execute the software application to:
   transmit light through a scene, the scene including a medium described by an extinction function;
   define a control medium described by a control extinction function;
   determine a control transmittance of the light through the medium based on the control extinction function;
   define a residual extinction function;
   determine a residual transmittance of the light through the medium based on the residual extinction function;
   estimate a transmittance of the light through the medium as the product of the control transmittance and the residual transmittance; and
   render the scene, on the display, using the estimated transmittance of the light through the medium.

9. The device of claim 8, wherein the control extinction function corresponds to a local loss of the light per unit distance traveled through the control medium.

10. The device of claim 8, wherein the residual extinction function corresponds to the difference between the extinction function and the control extinction function.

11. The device of claim 8, wherein to determine the residual transmittance of the light through the medium based on the residual extinction function, the processor is configured to execute the software application to:
    define a fictitious medium described by a fictitious extinction function;
    determine a path through the medium, the path including a plurality of points;
    calculate one of a plurality of weights for each of the plurality of points, the one of the plurality of weights corresponding to one minus the ratio of the residual extinction function to the fictitious extinction function; and
    estimate the residual transmittance of the light through the medium as a product of the plurality of weights.

12. The device of claim 11, wherein the path is determined using the fictitious medium, and wherein a distance between any two consecutive points from the plurality of points is computed using the fictitious extinction function.

13. The device of claim 11, wherein the medium includes a heterogeneous medium and the fictitious medium includes a homogeneous medium.

14. A method for use by a device having a processor and a display for calculating a transmittance of light through a medium in a scene, the method comprising:
    transmitting, by the processor, the light through the scene, the scene including the medium described by an extinction function;
    defining, by the processor, a fictitious medium described by a fictitious extinction function;
    determining, by the processor, a path through the medium, the path including a plurality of points;
    calculating, by the processor, one of a plurality of weights for each of the plurality of points, the one of the plurality of weights corresponding to one minus the ratio of the extinction function to the fictitious extinction function;
    estimating, by the processor, the transmittance of the light through the medium as a product of the plurality of weights; and
    rendering the scene, by the processor on the display, using the estimated transmittance of the light through the medium.

15. The method of claim 14, wherein the extinction function corresponds to a local loss of the light per unit distance traveled through the medium.

16. The method of claim 14, wherein the fictitious extinction function corresponds to a local loss of the light per unit distance traveled through the fictitious medium.

17. The method of claim 14, wherein the fictitious extinction function is defined such that free-flight distances in the fictitious medium can be sampled analytically.

18. The method of claim 14, wherein the path connects two vertices of interest between which the transmittance is to be estimated through the medium.

19. The method of claim 14, wherein the path is determined using the fictitious medium, and wherein a distance between any two consecutive points from the plurality of points is computed using the fictitious extinction function.

20. The method of claim 14, wherein the medium includes a heterogeneous medium and the fictitious medium includes a homogeneous medium.

* * * * *